US012010774B2

(12) United States Patent
Halbritter

(10) Patent No.: US 12,010,774 B2
(45) Date of Patent: Jun. 11, 2024

(54) PWM CONTROLLED POWER SOURCE AND METHOD

(71) Applicant: OSRAM Opto Semiconductors GmbH, Regensburg (DE)

(72) Inventor: Hubert Halbritter, Dietfurt-Toeging (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 134 days.

(21) Appl. No.: 17/772,892

(22) PCT Filed: Oct. 23, 2020

(86) PCT No.: PCT/EP2020/079933
§ 371 (c)(1),
(2) Date: Apr. 28, 2022

(87) PCT Pub. No.: WO2021/083812
PCT Pub. Date: May 6, 2021

(65) Prior Publication Data

US 2022/0418068 A1 Dec. 29, 2022

(30) Foreign Application Priority Data

Oct. 29, 2019 (DE) ..................... 10 2019 129 212.3

(51) Int. Cl.
*H05B 45/325* (2020.01)
*G09G 3/32* (2016.01)

(52) U.S. Cl.
CPC ............. *H05B 45/325* (2020.01); *G09G 3/32* (2013.01); *G09G 2320/064* (2013.01)

(58) Field of Classification Search
CPC ........ H05B 45/325; H05B 45/37; G09G 3/32; G09G 2320/064

(Continued)

(56) References Cited

U.S. PATENT DOCUMENTS 11,302,248 B2 * 4/2022 Halbritter ............ G09G 3/2077
2018/0211582 A1 * 7/2018 Sakariya .................. G09G 3/32

(Continued)

FOREIGN PATENT DOCUMENTS

CN 1540615 A 10/2004
CN 104299570 A 1/2015

(Continued)

OTHER PUBLICATIONS

International Search Report issued for corresponding International Patent Application No. PCT/EP2020/079933 on Jan. 27, 2021, along with an English translation, 5 pages.

(Continued)

*Primary Examiner* — Ryan Jager
(74) *Attorney, Agent, or Firm* — Hauptman Ham, LLP

(57) ABSTRACT

A PWM controlled current source includes a selection input, a modulation input, a switchable current source which can be switched by means of a signal at a control terminal and whose current output is configured for connection to a load, and an inverter circuit including an input node and an output coupled to the control terminal. The inverter circuit has a capacitance conditioned by elements of the inverter circuit. A start signal can be supplied to the input node in dependence on a selection signal at the selection input, which controls the switchable current source via the inverter circuit. The PWM controlled current source also includes a voltage-to-current converter that generates a current derived from a modulation signal at the modulation input and supplies it to the input node. The supplied current disconnects the switchable current source after a time period predetermined by the conditioned capacitance.

13 Claims, 3 Drawing Sheets

Figure 1:
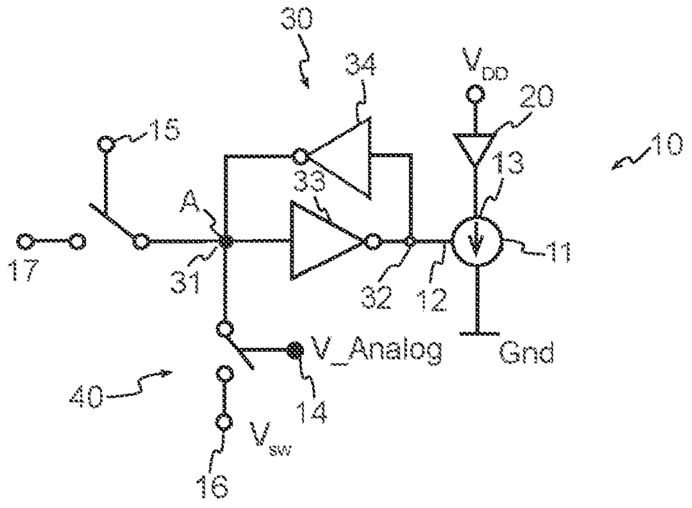

(58) Field of Classification Search
USPC .......................................................... 315/291
See application file for complete search history.

(56) References Cited

U.S. PATENT DOCUMENTS

| | | | | |
|---|---|---|---|---|
| 2019/0114987 | A1* | 4/2019 | Li | G09G 3/3233 |
| 2019/0325806 | A1 | 10/2019 | Hashimoto | |
| 2022/0101781 | A1* | 3/2022 | Baumheinrich | G09G 3/32 |
| 2022/0418068 | A1* | 12/2022 | Halbritter | G09G 3/32 |

FOREIGN PATENT DOCUMENTS

| | | | |
|---|---|---|---|
| CN | 108538206 | A | 9/2018 |
| CN | 110010627 | A | 7/2019 |
| CN | 110190104 | A | 8/2019 |
| CN | 110390905 | A | 10/2019 |
| DE | 102017122014 | A1 | 3/2019 |

OTHER PUBLICATIONS

Written Opinion issued for corresponding International Patent Application No. PCT/EP2020/079933 on Jan. 27, 2021, 6 pages.

* cited by examiner

PWM CONTROLLED POWER SOURCE AND METHOD

CROSS REFERENCE TO RELATED APPLICATION

This application is a National Stage of International Application No. PCT/EP2020/079933, filed on Oct. 23, 2020, which designates the United States and was published in Europe, and which is based upon and claims priority to German Patent Application No. 10 2019 129 212.3, filed on Oct. 29, 2019 in the German Patent Office. Both of the aforementioned applications are hereby incorporated by reference in their entireties.

The present invention relates to a PWM controlled current source, a pixel array, and a method of operating a PWM controlled current source.

Pulse width modulation (PWM) circuits are conventionally used to supply loads with adjustable current. A typical example are optoelectronic components, so-called light emitting diodes, which are controlled by pulse width modulation in order to generate light of a brightness specified by the modulation. Pulse width modulation is frequently encountered in the field of display technology. For this purpose, for example, a switchable current source is connected in a path with a load, e.g. a light-emitting diode. The brightness of the light emitting diode can then be adjusted by the width of the pulse. The frequency of the pulse width modulation is selected so high that the eye or other sensors do not notice the switching process.

In some cases, the inertia of the light emitting diode is also exploited, but this behavior is rather undesirable for more precise brightness gradations. In current applications with modern displays and higher integration densities, the circuits used so far are slowly reaching their limits. On the one hand, the requirements for brightness gradations are becoming greater, and on the other hand, the current sources and PWM circuits need space, which is becoming increasingly critical in the area of so-called μ-LEDs. μLEDs are optoelectronic components with an edge length in the range of a few μm, for example smaller than 70 μm or even smaller than 20 μm.

There is therefore a need for a PWM controlled current source which can be used at high integration densities.

This need is met with a power source, with a pixel arrangement, and with a method of operating a power source in the independent claims. Aspects and further embodiments result from the subclaims.

The invention is based on the principle of using the SRAM concept for PWM modulation by suitably exploiting the switching operation of the SRAM cell. In particular, the output signal of a cell controlled in this way is used to switch a current source into a current path or to disconnect it from the power supply.

Since the SRAM concept is well understood on the one hand and on the other hand can also be realized with a high integration density, it can be used to realize a PWM modulated current source whose area size is in the range of a few μm edge length. Thus, the concept can be realized either directly in a material system, which is also used for the fabrication of an optoelectronic device or another load. Alternatively, the PWM controlled current source can be manufactured in one technology, and the load in another technology. These two separately produced elements can then be brought together.

In one aspect, a PWM controlled current source includes a selection input and a modulation input. A current source is further provided that is switchable by means of a signal at a control terminal. A current output of the current source switchable in this way is configured for connection to a load. The controller further comprises an inverter circuit having an input node and an output coupled to the control terminal, the inverter circuit having a capacitance conditioned by elements of the circuit. A signal can be supplied to the input node of the inverter circuit in response to a selection signal at the selection input, which signal drives the switchable current source via the inverter circuit. The current source can thus be switched on or off by this signal at the input node. "Switched on" in this case means that a load connected to the current source is supplied with current by the current source.

According to the invention, a voltage-to-current converter is further provided which generates a current derived from a modulation signal at the modulation input and supplies it to the input node, the supplied current disconnecting the switchable current source after a period of time predetermined by the conditional capacitance.

The pulse width modulation is thus performed by the interaction of the inverter circuit with the voltage-current converter. For this purpose, the capacitances present in the inverter circuit are utilized. The term "capacitance conditioned by elements of the circuit" is understood to mean all parasitic or deliberately introduced or technologically conditioned capacitances, which influence a switching process, in particular which have to be recharged for switching the inverter circuit. Among others, such capacitances are formed by the gate-source capacitance and the gate-drain capacitance of the field effect transistors of the inverter circuit. However, also feed lines, in the input node or other structures show parasitic capacitances. The size of the capacitances is about 0.1 fF to 1 fF. Due to the small capacitances, the amount of current required is also very small, which avoids unwanted heating. Pulse lengths in the range of 4 to 5 orders of magnitude can be realized, for example from 0.1 μs to 10 μs.

The capacitors in the inverter circuit are charged or discharged by the current, so that the inverter circuit changes its output signal after some time. The duration depends on the size of the current. This is determined by the modulation signal. Since the modulation signal represents a voltage whose value can be set exactly, the switching time of the inverter circuit and thus the pulse width can be set in very fine steps.

The modulation signal may be obtained from a digital signal. In aspects, the width of such a digital signal can be 8, 16 or even 20 bits.

In another aspect, the inverter circuit is formed by an SRAM cell. In one aspect, the inverter circuit comprises a first inverter and a second inverter, wherein an input of the first inverter is connected to an output of the second inverter and to the input node. The two inverters comprise the same structure, i.e., their electrical parameters are substantially the same (or have a known relationship to each other) and differ only due to process variations. In another aspect, an output of the first inverter is coupled to an input of the second inverter and to the control terminal of the power source.

In another aspect concerns the control of the inverter circuit. In one aspect, the start signal comprises a differential start signal, wherein a partial signal is provided to the input node and an inverted partial signal is provided to the control terminal of the power source. In one aspect, an SRAM cell holds the start signal. Thus, the start signal can be quite short, but the current source can be controlled by the inverter circuit for a much longer time.

Another aspect relates to the voltage-to-current converter. This may comprise a defined capacitance for storing the modulation signal. The capacitance temporarily stores the voltage of the modulation signal. This can be done at different times, allowing greater flexibility to be achieved. The voltage thus stored is then converted into a current derived therefrom, for example a current proportional thereto, which is fed to the input node of the inverter circuit.

In an application, the voltage-to-current conversion in the converter is performed by a controlled path which converts the modulation signal or a signal derived therefrom into a current. For this purpose, the controlled path is arranged between input nodes and a reference potential terminal. For this purpose, the controlled path may comprise a field-effect transistor that operates as a controllable resistor.

To reduce energy consumption, the voltage-to-current converter can be switched on or off depending on the signal at the selection input.

Another aspect relates to a pixel array, in particular for a display. As mentioned above, the power source is suitable for various loads, including optoelectronic components that are part of a display array or display matrix. This refers to a regular number of optoelectronic components arranged in rows and columns, each of which forms a pixel or subpixel. The pixel array comprises an optoelectronic device formed in a first material system, comprising at least one contact area on one side. Furthermore, the PWM controlled current source explained above is provided. This is formed in a second material system and comprises at least one contact area on one side. The contact areas of the two elements are electrically connected to each other, so that the optoelectronic component and the current source form a current path.

The term "material system" refers to a carrier or body in which the respective component or power source is implemented. In semiconductor technology, the material system comprises in particular a semiconductor material as the base material. For optoelectronic components, for example, this can be a III-V material such as GaN, InGaN, AlGaInN, i.e. nitride-based but also phosphide-based. For devices with other colors phosphides like GaP are suitable, for red light emitting diodes for example the AlGaAs/GaAs system can be used. Alternatively, the different colors can be produced from a blue optical light emitting diode by conversion with a dye.

A silicon-based system with SRAM cells is suitable for the power source. This allows both elements of the pixel array to be optimized in terms of area and power consumption respectively without having to make any compromises.

The pixel array can be formed from 2 parts brought together as described above, but can also be manufactured monolithically. Likewise, a plurality of optoelectronic components can be formed in the form of a matrix, whose contact surfaces are in electrical contact with corresponding contact surfaces.

Another aspect relates to a method for operating a PWM controlled current source. Here, the controlled current source comprises a switchable current source and an inverter circuit. The inverter circuit has an output connected to a control input of the switchable current source and has a capacitance conditioned by elements of the inverter circuit. In the method, a pulsed signal having a first pulse duration and a modulation signal are provided. A signal derived from the pulsed signal is then generated, which activates the switchable current source through the inverter circuit. The modulation signal is temporarily stored during the first pulse duration. Alternatively, the modulation signal may be buffered during a portion of the first pulse duration, for example at the end of the first pulse duration. A current signal is generated, the current signal depending on the temporarily stored modulation signal. The current signal thus generated is applied to the inverter circuit so that the inverter circuit deactivates the current source after a second pulse duration.

In this way, the capacities available in an inverter circuit are utilized to generate one or more pulses by means of a current signal. The pulse length depends on the current signal, since this recharges the capacitors and thus causes the inverter circuit to "switch over". The current signal can be in the range of a few nA and is derived from a modulation signal. The inverter circuit can be designed as an SRAM cell, which means that an already well understood technology can be used for this new application.

In one example, the current signal is generated by a controlled path, the control being effected by the magnitude of the modulation signal. The modulation signal can be stored temporarily, especially as a voltage signal. Since the voltage signal can be adjusted much more finely, the modulation signal can be stored temporarily to form a particularly finely graduated current signal which is used to generate a pulse.

The power consumption of both the proposed method and the pixel array and controlled current source is very low. The consumption of the inverter circuit is mainly determined by the capacitances of the components of the inverter circuit, which are additionally used to set the pulse duration.

Figure 2:
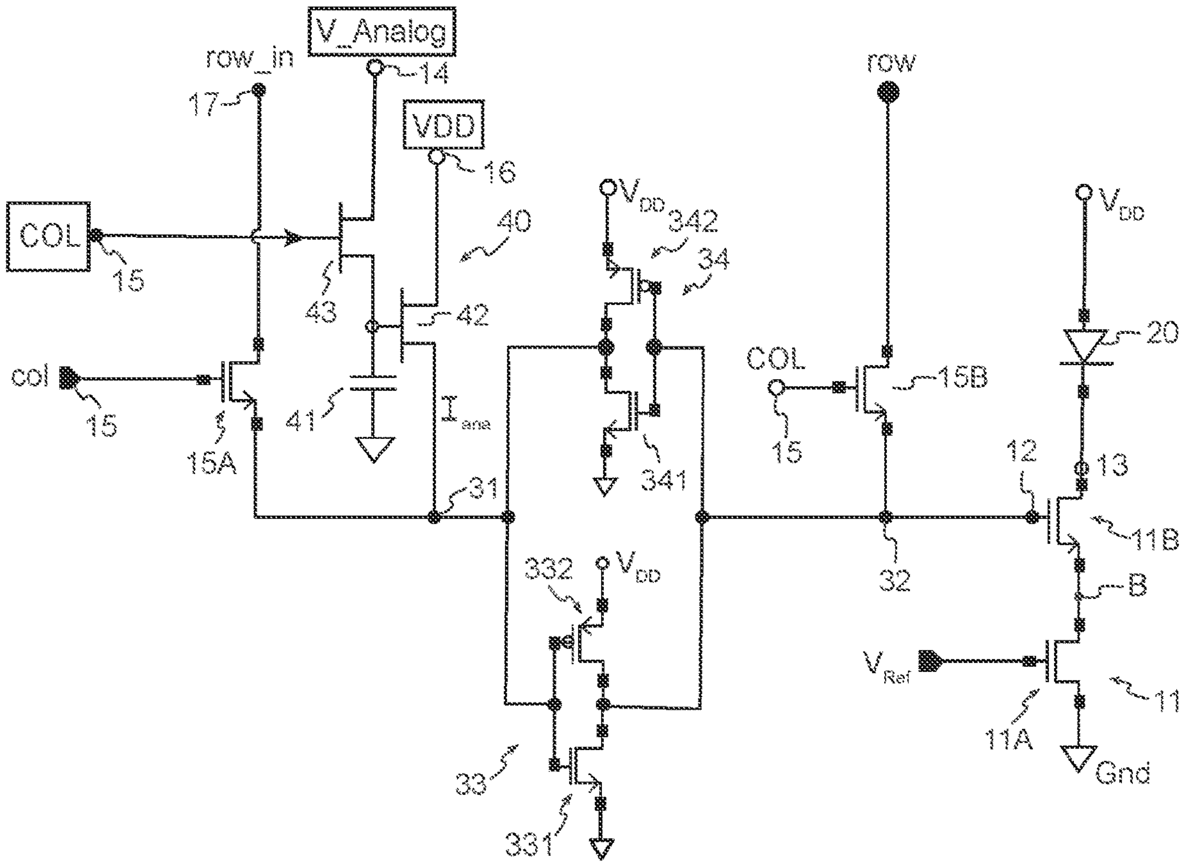
Figure 3:
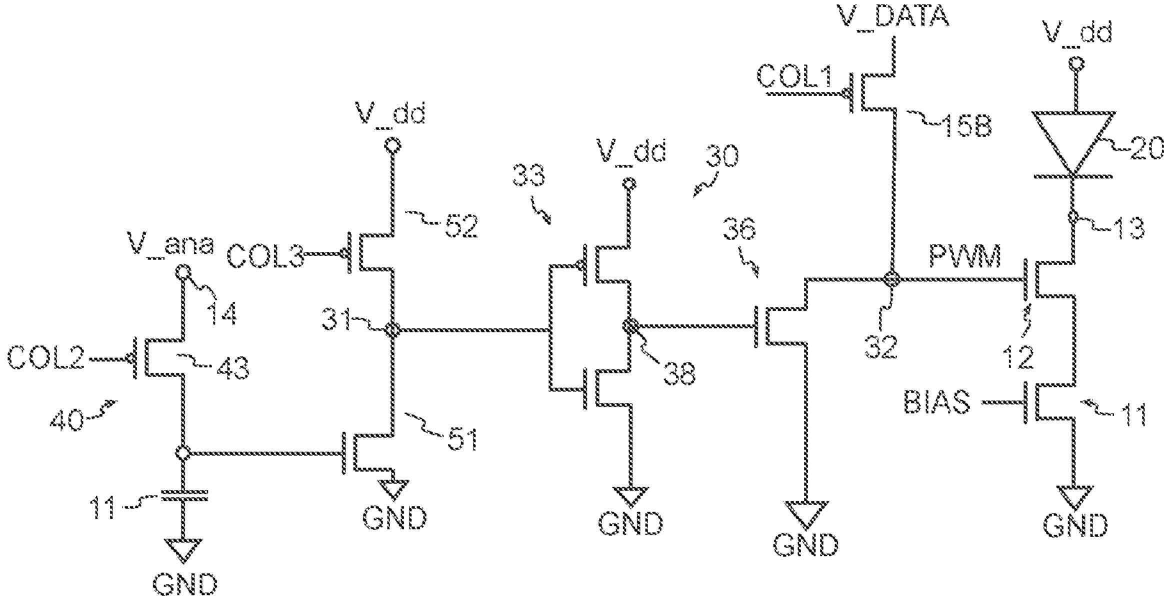
Figure 4:
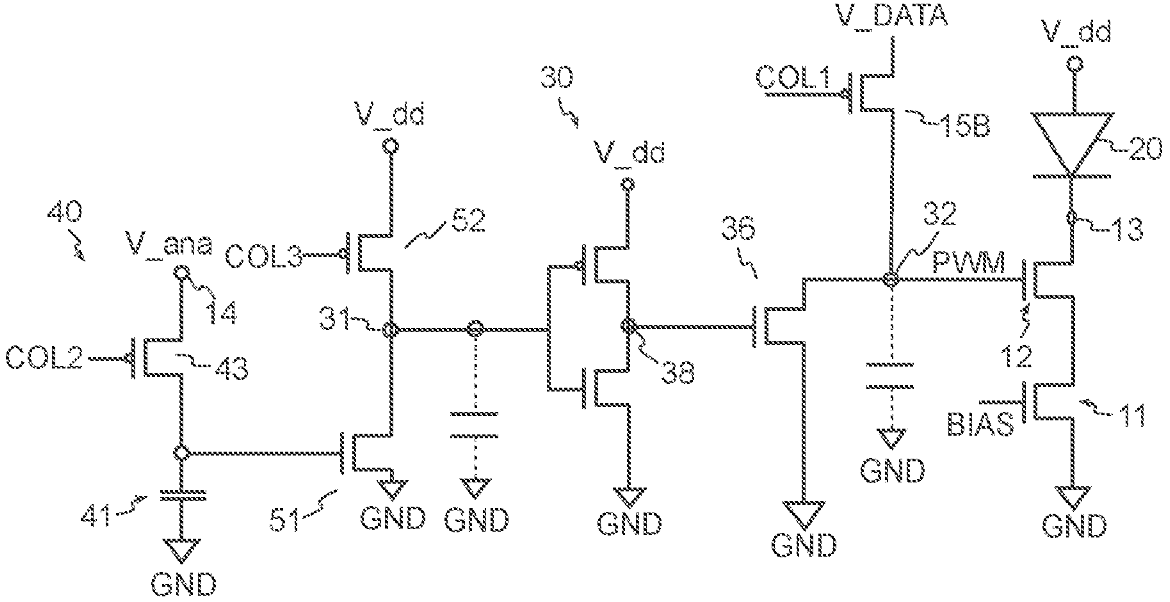
Figure 5:
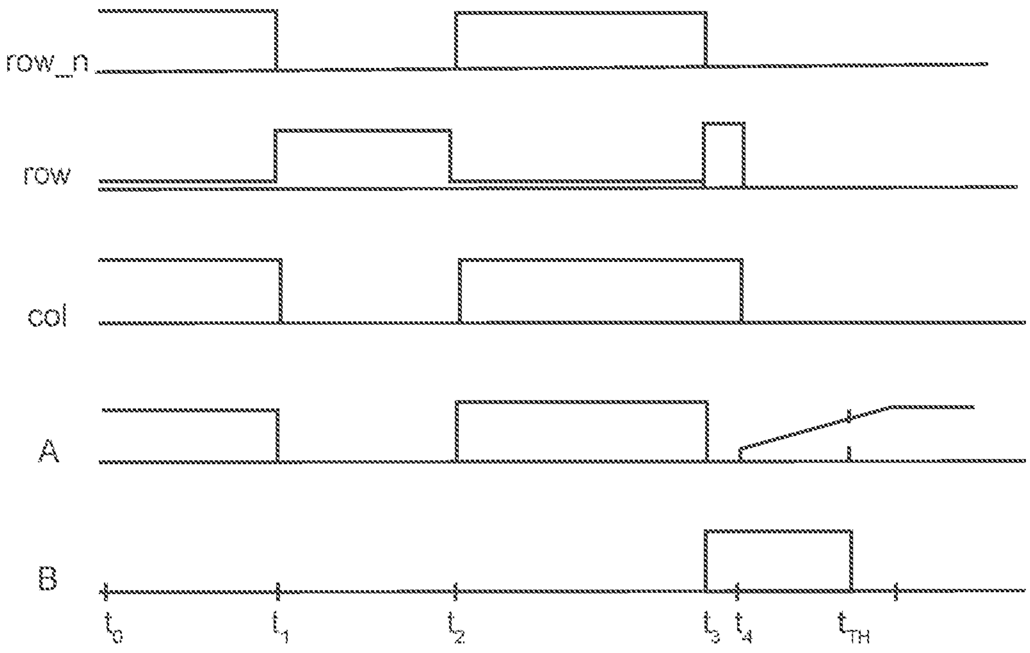
Figure 6:
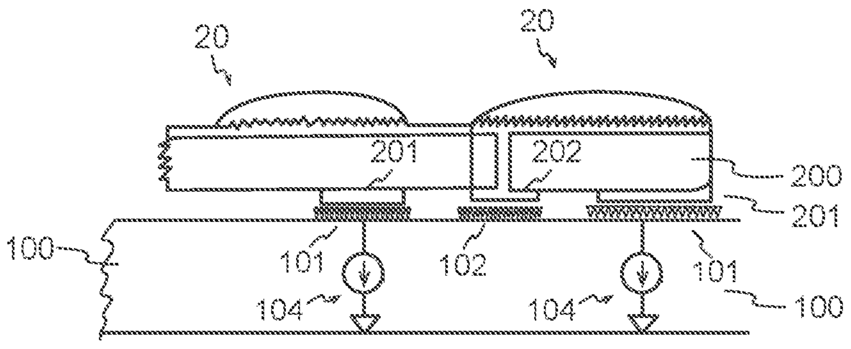

In the following, the invention is explained in more detail by means of several embodiment examples with reference to drawings. Thereby show:

FIG. 1 a conceptual circuit diagram according to the proposed principle;

FIG. 2 shows an embodiment according to the proposed principle using an SRAM cell;

FIG. 3 a further embodiment of the invention;

FIG. 4 an alternative embodiment of the representation of FIG. 3;

FIG. 5 a time signal in diagram showing the time course of different signals according to the embodiment of FIG. 2;

FIG. 6 an embodiment of a pixel array according to the proposed principle.

The following embodiments and aspects of the proposed principle form different aspects for a control of a load and in particular of an optical component with a pulse width modulation. The individual aspects can be interchanged with one another, combined with one another or even partially omitted without contradicting the principle according to the invention. The individual embodiments are realized with field-effect transistors of different conductivity types. The person skilled in the art is aware of the possibility to interchange the conductivity type of these transistors or to use other transistor types such as MIS or BJT transistors where necessary.

FIG. 1 shows a conceptual schematic of the proposed principle of a pulse-width modulated current source, in which the modulation is performed by an SRAM cell or a part thereof. The technology and functionality of an SRAM cell is well known, so that it can be realized with a very small space consumption in a semiconductor body. Such a realization is therefore also suitable for very small devices such as PLED.

The PWM controlled current source 10 includes a current path dis-posed between a supply potential VDD and a reference potential GND. The reference potential may be a ground potential or other potential. The current path includes a switchable current source 11 connected in series and an optoelectronic component 20. Instead of the optoelectronic component 20, another component or circuit may be used. The switchable current source 11 has a current output 13 and a control input 12, to which a signal for activating or deactivating the switchable current source is applied. In other words, the signal at its control input 12 activates or deactivates the output 13 of the switchable current source.

To control the current source, an inverter circuit 30 is provided whose output node 32 is connected to the control input 12. The inverter circuit also comprises an input node 31 and two inverters 33 and 34. In detail, a first inverter 33 is connected on the input side to the input node 31 and on the output side to the output node 32. A second inverter 34 has its output connected to the input node 31 and its input connected to the output node 32 of the inverter circuit. Thus, the two individual inverters 33 and 34 are connected against each other.

The input node 31 is connected via a switch to a start signal terminal 17 for supplying a start signal. The switch can be controlled by a signal at a selection input 15. Finally, a voltage-to-current converter 40 is provided, which is connected on the output side to the input node 31. Depending on a modulation signal V_Analog at its modulation input 14, the voltage-to-current converter 40 generates a current signal which is fed to the input node 31.

The conceptual representation of a PWM controlled current source shown in FIG. 1 now operates as follows. At a first time, a selection signal COL at the selection input 15 applies the start signal at terminal 17 to the input node 31 of the inverter circuit 30. This signal (logic "1" or "high") produces a logic "0" at the output 32 of the inverter circuit, i.e. a low level, whereby the current source is switched off. At a second time, a start signal is now applied to the input 17, for example a short pulse from logic "1" to logic "0". This switches the inverter circuit of output node 32 to a high potential, activating the current circuit, allowing current to flow in the current path through load 20. Shortly after the inverter circuit has switched over, the switch is also opened by the selection signal COL at the selection input 15, so that the inverter circuit 30 now temporarily retains its output signal.

At the same time, the voltage-to-current converter 40 is activated via the analog voltage signal V_Analog and supplies a current signal proportional to the analog voltage signal V_Analog to the input node 31.

The various capacitances of the inverter circuit 30, for example the gate-source or gate-drain capacitances at the input of the inverter 33 but also parasitic capacitances in the leads are essentially discharged by the preceding start signal, i.e. the low pulse. They are then slowly recharged by the current signal from the voltage-to-current converter 40 at node 31, the current intensity depending on the analog modulation signal. The supplied current thus causes a voltage rise at the gates of inverter 33, causing it to switch after a defined period determined by the magnitude of its capacitances and causing the output signal at output node 32 to fall back from logic 1 to logic 0. This deactivates the current source again.

The current signal generated by the voltage-to-current converter charges the various input capacitances of the inverter circuit and thus builds up a voltage at the input of the inverter circuit 33. When this voltage reaches the threshold voltage specified by the inverter circuit, the inverter circuit switches over and generates a corresponding output signal. By selecting and adjusting the magnitude of the current signal, a very short pulse duration can be generated.

FIG. 2 shows a concrete embodiment of a current source controlled by a PWM signal, in which this is generated by an SRAM cell. Here, too, the switchable current source is part of a current path which is connected between a supply potential VDD and a reference potential GND. The current source 11 comprises a first field effect transistor, to the gate of which a reference signal $V_{Ref}$ is applied. This sets the current flow through the field effect transistor.

In addition, the current source 11 includes a control terminal 12 that is also connected to a gate of a second series-connected field-effect transistor 11B. The transistor 11B interrupts or switches the complete current path. The load in the form of a light-emitting diode 20 is connected to the terminal of transistor 11B, which also forms the output of the switchable current source 13. A control signal at the control input 12, which is formed by the gate of the transistor 11B, is thus used to supply the load with a current. The current flowing through the load 20 is fixed by the reference signal $V_{Ref}$.

An output node 32 of an in value circuit 30 is tied to the control signal terminal 12. The inverter circuit 30 includes a first inverter 33 and a second inverter 34. Both inverters are connected in opposite directions to each other, i.e., the output of inverter 34 is connected to the input of inverter 32, and the output of inverter 33 is connected to the input of inverter 34. Each of inverters 33 and 34 includes two series-connected field-effect transistors of different conductivity types. Specifically, a p-type field effect transistor 332 or 342 is connected to a supply potential terminal VDD. The respective series-connected second n-type field effect transistor 331 and 341 is connected to the ground potential terminal.

The input node 31 of the inverter circuit is now coupled to a signal terminal 17 via a field effect transistor 15A operating as a switch. The field effect transistor 15A is used to select the start signal row_n and is coupled to the selection input 15 to supply the selection signal COL for this purpose. Similarly, the output node 32 of the inverter circuit 30 is also connected to a signal terminal 17 via another field effect transistor 15B. However, a differential, i.e., inverted, start or switching signal row is applied to this signal terminal. The selection transistor 15B is in turn connected to the selection input, and its gate is connected to the selection input 15.

Finally, the input node 31 includes a connection for the voltage-to-current converter 40. The voltage-to-current converter 40 includes a capacitor 41 of predetermined capacitance to which the analog modulation signal V_Analog is fed at the modulation input 14 via a switchable field effect transistor 43. The transistor 43 is connected with its control terminal to the selection input for feeding the selection signal COL. A node is provided between the field effect transistor 43 and the capacitor 41, which leads to a control terminal of a controlled path 42. The controlled path 42 is also a field effect transistor and forms a variable resistor for voltage-to-current conversion. An output of the controlled section 42 is connected to the node 31, and an input of the controlled section 42 is connected to a reference voltage input 16 for the reference signal VDD.

FIG. 5 now shows different signals for the operation of the circuit according to FIG. 2 at different times. The differential row signal row and row_n are used as start and switching signals. Here, the signal row_n is fed to the input node via the selection signal COL, and the differential and inverted start signal row is fed to the output node 32 and the control terminal 12 as a function of the selection signal COL.

The selection signal COL on the one hand controls the start signals for the inverter circuit and on the other hand serves for the intermediate storage of the analog modulation signal V_Analog. The last two rows of FIG. 5 show the signals at points A and B, i.e. essentially the voltage signals at input node 31 and output 32 of the inverter circuit.

At time t0 the voltage signal row_n is at a high level, in the same way the differential start signal row is inverted and at a low level. At the same time, the selection signal COL is at a logically high level. As a result, the field effect transistor 15A switches through for the start signal row_n, so that a high level is also present at node 31. This is indicated in line A. The output node 32 of the inverter circuit is accordingly at a logic low level. This level is provided both by the output signal of the inverter itself and by the differential start signal row and the switching transistor 15B. This blocks the switchable current source and the load, in this case the light emitting diode is switched off.

At time t1, the selection signal COL switches to a low level. This disables transistors 15A and 15B so that inverter circuit 30 maintains its respective output signal, in this case logic low, regardless of the differential start signal. In this mode of operation, the SRAM cell from the two inverters thus maintains its last state. The current source 11 remains disabled.

At time t2, the selection signal COL at selection input 15 is activated again and switches the two transistors 15A and 15B. Accordingly, a logically low level is still present at output 32 of the inverter circuit, which means that the current source is also still blocked. Now the current source is to be switched on. For this purpose, a short pulse is generated at time t3 by the differential start signal row_n and row. This is formed by the differential start signal row_n falling from logically high level to logically low level. The inverted start signal row at the output of the inverter gives a short pulse. Accordingly, the inverter circuit generated a logic high level at the output and the load 20 is supplied with current. During the period T3 to T4 also the input capacitances of the inverter 33, as well as the parasitic capacitances are discharged, because the node 31 is essentially pulled to low level, e.g. to ground potential.

Independently of this, the voltage-current transformer is also activated by the selection signal COL. Here, from time t2 to time t4, the switching transistor 43 is closed and thus the modulation signal V_Analog is applied to the capacitor 41. This is stored in the capacitor. At the same time, the modulation signal V_Analog is applied to the node at the gate of the controlled section 42. The controlled path thus generates a current Iana which is supplied to the input node 41. The amplitude of the current Iana depends on the reference potential VDD and the analog modulation signal at the modulation input 14. In a linear range of the controlled section, a proportional current signal is thus generated from the modulation signal.

This current signal is fed to the inverter circuit from time T2 and is superimposed on the start signal row_n during the period t2 to t3. At time t3, the input node 31 is pulled to a logic low level by the differential start signal row_n and the input of the inverter 34 and this is independent of the supplied current. The reason for this is that the supplied current Iana is very small and through connected transistor 341 has only a very small resistance to ground potential. This means that no voltage can build up across the gate of transistors 331 and 332.

At time t4 the selection signal COL is switched off and the transistors 15A and 15B block. Similarly, transistor 43 of the volt-age-to-current converter also blocks. This temporarily stores the voltage V_Analog impressed across capacitor 41. The capacitor 41 continues to generate a voltage at the gate of the controlled path 42, causing a proportional current signal. The current signal, applied to node 31, now recharges the capacitors of inverter circuit 33. As a result, the gate-source voltage of the two transistors 331 and 332, respectively, slowly increases until the switchover point $t_{TH}$ is reached. This switchover point is below the logic high level, for example above 50% of the logic high level, for example 55% to 60%. The inverters can have a built-in hysteresis so that slight fluctuations do not lead to malfunctions. At this point, the inverter circuit also switches back from a logic high level at the output signal 32 to a logic low level and the current source blocks again.

The slope of the signal shown in line A is determined by the magnitude of the current and the capacitances of the inverter circuit. Depending on the predetermined capacitance and the set current, pulse times in the range of 10 ns to 1 μs can be realized. The capacitances lie in a range from 0.1 fF to approx. 10 fF. Correspondingly, current strengths result in the range of a few nanoamperes to approx. 1 μA.

To further stabilize the embodiment of FIG. 2, it may be useful to provide an additional switch consisting of two field-effect transistors of different conductivity type arranged in parallel in the feedback path of the inverter circuit, i.e. from the inverter 34 to the input node 31. These are controlled so that they are open during the period t4 up to the switchover time $t_{TH}$, so that here the current impressed via the voltage-current transformer 40 only charges the capacitors of the transistor 33. By separating the output of inverter 34 from the input node by this additional measure, unwanted current flow to ground is prevented. At other times, the switch is closed and carries the output of 43 to the input node 31 or the input of inverter 33.

FIG. 3 shows an alternative embodiment of the proposed principle. In this embodiment, the current path is similarly configured with a current source 11, and a switch 12 formed by a field effect transistor, to which the pulse width modulated signal is applied so that the current source is switched into the current path. The output node 32 of an inverter circuit 30 is connected to the control input 12 and the gate of the field effect transistor. This inverter circuit comprises, in addition to the output node 32, an input node 31, an inverter 33 and an output stage 36. The inverter 33 is implemented in a similar manner to the corresponding inverter of FIG. 2. The output stage 36 comprises an n-type field effect transistor, which is connected to the ground potential and on the one hand and forms the output node 32 on the other hand. The control terminal of the field-effect transistor of the output stage 36 is connected to the output of the inverter 33.

On the input side, node 31 is connected between two field effect transistors 51 and 52. The first n-type field-effect transistor 51 is arranged between ground potential and input node 31, and the second p-type field-effect transistor 52 is arranged between supply potential VDD and input node 31. The transistor 51 also forms the controlled path for the voltage-to-current converter 40, which includes the modulation input 14, a switching transistor 43, and a storage capacitor 41.

The gate of the controlled path 51 is connected to a node between the switch 43 and capacitor 41. Different or the same selection signals COL1 to COL3 are fed to the transistors 15B, 52 and the switching transistor 43. When the selection signal COL3 is at a logic low level, the node 30 of the inverter circuit 33 is at logic high level, and the output node is at logic low level. As a result, the output transistor 36 blocks and a level dependent on the selection signal COL1 is applied to the output node 32. This level is essentially dependent on the state of the output signal COL1. When the output signal COL1 is at a low level, the V_Data signal is applied to the control terminal of the current source. Otherwise, the previous value is held in node 32.

The following table describes the various circuit states of the selection signals COL1 to COL3 and the resulting states at nodes 31, 38 and 32.

| Selection signal | Node 31 | Node 38 | Node 32 |
|---|---|---|---|
| COL1 (LOW) | — | — | V_Data |
| COL2 (LOW) | HIGH | LOW | V_Data |
| COL3 (LOW) | HIGH | LOW | V_Data |
| COL2 (HIGH) | Voltage is stored in capacitor and operates controlled circuit | | |
| COL3 (HIGH) | Value is stored and then slowly decreases | Changeover from LOW to HIGH occurs when $V_{TH}$ is reached | Switching from V_Data to LOW |

Here "LOW" means a low level, which turns on the field effect transistors 43, 52 and 15B. The low level of COL2 switches the controlled path on the one hand and charges the capacitor 41 on the other hand. Node 31 remains at a high level when COL3 is "LOW" at the same time. This also charges the internal capacitors connected to this node. The selection signal COL1 controls terminal 12 and thus loads the circuit with the data signal V_DATA. When transistor 36 is disabled, the current source is turned on or off depending on the data signal. In case, the selection signal COL3 is at "LOW", the node 38 is also at low level, the transistor 36 blocks.

In the further operating case, the selection signals COL1, COL2, COL3 are set to a high level HIGH, causing transistors 43, 52 and 165B to block. As capacitor 41 temporarily stores the charge, controlled path 51 continues to be driven and a current flows into node 31, discharging the capacitances of the node and the input capacitances of inverter 33, for example, the gate-source capacitance. As a result, the voltage at node 31 slowly decreases with respect to ground, the decrease depending on the resistance of the path 51 and thus on the modulation signal V_ana. When the switching point is reached, the inverter switches from a low to a high level on the output side and the output stage 36 opens and connects the ground terminal to the output node 32, pulling the control board 12 to dimensions and disabling the current source.

Thus, the data signal and the modulation signal result in a pulse at the control terminal of the current source, the width of which is specified by the modulation signal. The current itself is only a few nA, and the pulse can be selected from 10 ns to approx. 1 μs.

In the above representation there are several externally supplied signals. Besides the supply VDD and the data signal V_DATA these are the ground GND, the reference signal BIAS for the current source and the different selection signals COL1 to COL3. However, as can be seen above, the latter can be combined to one selection signal. At this point, it is only necessary to take care that the switching times are chosen appropriately in order to achieve un-desired or undefined states of the circuit. This can be avoided, for example, by slightly different propagation times to the respective control terminal.

FIG. 4 shows an alternative embodiment. In contrast to the example in FIG. 3, capacitor 41 is formed by a parasitic capacitance, for example by the gate capacitance of transistor 51. Likewise, lines may have a capacitance, in which the analog modulation signal can be stored. The desired capacitance can be achieved by suitable fabrication and selection of the transistor dimension. Similarly, a parasitic capacitance can be specified in the input node 31 and also in the output node 32. These also influence the pulse length and must also be reloaded during the switching process, resulting in a certain rise time or fall time and thus a minimum pulse width.

The use of the principle of an SRAM cell together with a voltage-to-current converter to generate a PWM modulated signal for con-trolling the current source allows it to be manufactured in a highly integrated manner using suitable technologies. The current path formed by the load and the current source can be manufactured separately using different technologies. FIG. 5 shows a section of such a pixel array. This is part of a larger display matrix in which a large number of pixels 20 are arranged in columns and rows. The pixels as optoelectronic components are designed as μLEDs, whose edge length is only a few μm. The μLEDs are manufactured in a first material system 200. The material system 200 is selected to match the desired wavelength of the μLEDs. For example, the μLEDs 20 of the pixel arrangement are designed to generate blue light during operation. A GaN-based material system is suitable for this purpose.

In a semiconductor made of GaN, differently doped layers are de-posited or otherwise fabricated so that an active layer is formed between the differently doped layers in which charge carriers recombine under emission of blue light. Quantum wells can also be used as an active layer. The differently doped layers are contacted. In FIG. 5, this is effected by a first contact 202 and a second contact 201, both of which are arranged on a surface of the semiconductor body made of the first material system 200. The contact 201 contacts one of the two differently doped layers, for example the n-doped layer. The other contact 202 is guided through the semiconductor body in an insulated manner by means of via and contacts the second layer of the semiconductor body via a structured transparent conductive layer. The transparent conductive layer contains ITO, for example, and is patterned to improve radiation from the semiconductor body. As shown, the contact 202 may be provided as a common contact for multiple optoelectronic devices or μLEDs.

Further optical elements can be provided on the semiconductor body and above the individual μLEDs for beam and light guidance. In the example of FIG. 5, the μ-lenses provide directional radiation essentially perpendicular to the surface of the semiconductor body.

The semiconductor body made of the second material system and in particular the contacts are applied to corresponding contact surfaces of a further semiconductor body. This comprises the drive electronics and the current source and is made of a different material system 100. The current source is connected to the contact 101 on the surface as shown, so as to form the current path together with the optoelectronic component. The material system 100 is different from the material system 200 and comprises, for example, silicon. Silicon is suitable for fabricating the circuit according to the proposed principle because it allows high integration density with only small space consumption. Accordingly, the semiconductor body 100 comprises on its surface a plurality of contact pads which are electrically conductively connected to the contacts of the semiconductor body with the material system 200. For this purpose, both bodies are aligned with each other and then bonding or other methods are used to perform the connection.

The production in two different material systems allows both components, i.e. μLED and control and supply separately in the optimal technology for the respective application. Both can then be brought together.

LIST OF REFERENCE SIGNS

10 PWM controlled current source
11 Switchable power source
12 Control port
13 Current output
14 Modulation input
15 Selection input
16 Reference voltage input
17 signal terminal
20 optoelectronic device
30 Inverter circuit
31 Input node
32 Output
33, 34 Inverter
40 Voltage-current converter
COL Selection signal
row_n, rowStart signal

The invention claimed is:

1. A PWM controlled current source, comprising:
- a selection input;
- a modulation input;
- a switchable current source which can be switched by means of a signal at a control terminal and whose current output is configured for connection to a load;
- an inverter circuit comprising:
  - an input node; and
  - an output coupled to the control terminal, the inverter circuit having a capacitance conditioned by elements of the inverter circuit; and
- a voltage-to-current converter coupled to the modulation input and the input node of the inverter circuit, wherein the voltage-to-current converter generates a current derived from a modulation signal at the modulation input and supplies the current to the input node, and the supplied current disconnects the switchable current source after a time period predetermined by the conditioned capacitance, wherein
- the inverter circuit comprises a first inverter and a second inverter, with an input of the first inverter being connected to the input node and to an output of the second inverter, and
- a start signal is supplied to the input node based on a selection signal at the selection input, which controls the switchable current source via the inverter circuit.

2. The PWM controlled current source of claim 1, wherein an output of the first inverter is coupled to an input of the second inverter and to the control terminal of the current source.

3. The PWM controlled current source according to claim 1, wherein the capacitance conditioned by elements of the circuit is formed at least in part by the gate-source capacitance and the gate-drain capacitance of the field effect transistors of the inverter circuit.

4. The PWM controlled current source according to claim 1, wherein the start signal is a differential start signal, a partial signal being supplied to the input node and an inverted partial signal being supplied to the control terminal of the current source.

5. The PWM controlled current source according to claim 1, wherein the voltage-to-current converter comprises a defined capacitance, in particular a capacitor with defined capacitance for storing the modulation signal.

6. The PWM controlled current source according to claim 1, wherein the voltage-to-current converter comprises a path controlled by the modulation signal or a signal derived therefrom and arranged between input nodes and a reference potential terminal.

7. The PWM controlled current source according to claim 1, wherein the voltage-to-current converter is activatable in dependence on the selection signal at the selection input.

8. A pixel arrangement, in particular for a display, comprising:
- an optoelectronic device formed in a first material system and comprising at least one contact surface on one side;
- a PWM controlled current source according to claim 1, formed in a second material system and having on one side at least one contact surface electrically connected to the at least one contact surface of the optoelectronic device such that the optoelectronic device and current source form a current path.

9. The pixel arrangement according to claim 8, wherein the optoelectronic device is arranged with its contact surface on a side of a body comprising the PWM controlled current source.

10. The pixel arrangement according to claim 8, wherein the second material system is based on silicon.

11. A method of operating a PWM controlled current source comprising a selection input, a modulation input, a switchable current source, an inverter circuit, and a voltage-to-current converter, the inverter circuit being connected on an output side to a control input of the switchable current source, the inverter circuit comprising a first inverter and a second inverter, with an input of the first inverter being connected to the input node and to an output of the second inverter, and a capacitance conditioned by elements of the circuit, the method comprising the steps of:
- providing a pulsed signal with a first pulse duration;
- providing a modulation signal;
- generating a signal derived from the pulsed signal, which activates the switchable current source through the inverter circuit, wherein the signal is supplied to the input node based on the pulsed signal, and the signal controls the switchable current source via the inverter circuit;
- latching the modulation signal during the first pulse duration or a part of it;
- generating a current signal depending on the buffered modulation signal;
- supplying the current signal to the inverter circuit so that the inverter circuit deactivates the current source after a second pulse duration.

12. The method of claim 11, wherein the second pulse duration depends on the current signal generated by a controlled path.

13. A PWM controlled current source, comprising:
- a selection input;
- a modulation input;
- a switchable current source which can be switched by means of a signal at a control terminal and whose current output is configured for connection to a load;
- an inverter circuit comprising:
  - an input node; and
  - an output coupled to the control terminal, the inverter circuit having a capacitance conditioned by elements of the inverter circuit; and
- a voltage-to-current converter that generates a current derived from a modulation signal at the modulation input and supplies the current to the input node, and the supplied current disconnects the switchable current source after a time period predetermined by the conditioned capacitance, wherein a start signal is supplied to the input node based on a selection signal at the selection input, which controls the switchable current source via the inverter circuit, and the voltage-to-current converter is activatable in dependence on the selection signal at the selection input.

* * * * *